(12) United States Patent
Hsieh (10) Patent No.: US 9,280,276 B2
(45) Date of Patent: Mar. 8, 2016

(54) METHOD FOR CONTROLLING ELECTRONIC DEVICE WITH TOUCH SCREEN AND ELECTRONIC DEVICE THEREOF

(71) Applicant: HTC Corporation, Taoyuan County (TW)

(72) Inventor: Yi-Kang Hsieh, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 168 days.

(21) Appl. No.: 13/938,184

(22) Filed: Jul. 9, 2013

(65) Prior Publication Data

US 2015/0015493 A1 Jan. 15, 2015

(51) Int. Cl.
*G06F 3/041* (2006.01)
*G06F 3/0488* (2013.01)

(52) U.S. Cl.
CPC .................................. *G06F 3/0488* (2013.01)

(58) Field of Classification Search
CPC .................................................... G06F 3/0488
USPC .......... 345/156–184; 715/238, 253, 835, 868; 726/7, 19; 177/180; 463/31; 382/114
See application file for complete search history.

(56) References Cited

U.S. PATENT DOCUMENTS

| | | | | |
|---|---|---|---|---|
| 5,369,262 A * | 11/1994 | Dvorkis | .............. | G06F 3/03543 235/440 |
| 5,959,615 A * | 9/1999 | Yamade et al. | ................ | 345/173 |
| 8,187,090 B2 * | 5/2012 | Kondo | ............................. | 463/31 |
| 2002/0020569 A1 * | 2/2002 | Eigenmann et al. | .......... | 177/180 |
| 2004/0076312 A1 * | 4/2004 | Sweeney | ........................ | 382/114 |
| 2006/0119582 A1 * | 6/2006 | Ng et al. | ........................ | 345/168 |
| 2008/0129712 A1 * | 6/2008 | Nguyen | ................ | G06F 3/0488 345/179 |
| 2008/0141117 A1 * | 6/2008 | King et al. | ..................... | 715/238 |
| 2008/0178126 A1 | 7/2008 | Beeck | | |
| 2008/0274807 A1 * | 11/2008 | Kondo | ............................ | 463/31 |
| 2010/0325721 A1 * | 12/2010 | Bandyopadhyay et al. | .... | 726/19 |
| 2011/0088086 A1 * | 4/2011 | Swink et al. | ....................... | 726/7 |
| 2011/0164029 A1 * | 7/2011 | King | .................. | G06F 3/04883 345/419 |
| 2011/0202882 A1 * | 8/2011 | Forstall et al. | ................. | 715/835 |
| 2012/0007809 A1 | 1/2012 | Mahalingam | | |
| 2012/0102395 A1 * | 4/2012 | Cho et al. | ........................ | 715/253 |
| 2012/0268410 A1 * | 10/2012 | King | .................. | G06F 3/04883 345/173 |
| 2013/0265235 A1 * | 10/2013 | Cai et al. | ......................... | 345/169 |
| 2013/0328770 A1 * | 12/2013 | Parham | ................. | G06F 3/0304 345/157 |
| 2014/0109010 A1 * | 4/2014 | Casey | .................. | G06F 3/04883 715/835 |
| 2014/0118272 A1 * | 5/2014 | Gunn | ............................ | 345/173 |

(Continued)

FOREIGN PATENT DOCUMENTS

| | | |
|---|---|---|
| CN | 101943993 A | 1/2011 |
| TW | 201303661 | 1/2013 |
| TW | 201322081 | 6/2013 |

OTHER PUBLICATIONS

Office action mailed on Feb. 11, 2015 for the Taiwan application No. 102130282, filing date Aug. 23, 2013, p. 1-6.

*Primary Examiner* — Prabodh M Dharia
(74) *Attorney, Agent, or Firm* — Winston Hsu; Scott Margo (57) ABSTRACT

A method for controlling an electronic device with a touch screen includes detecting a sequence of touch inputs within a predefined area on the touch screen; determining a sequence of dots and bars according to the sequence of touch inputs; and performing a predefined function on the electronic device when the sequence of dots and bars conforms to a predefined sequence of dots and bars.

24 Claims, 11 Drawing Sheets

(56) References Cited

U.S. PATENT DOCUMENTS

| | | | |
|---|---|---|---|
| 2014/0157210 A1* | 6/2014 | Katz et al. | 715/863 |
| 2014/0298253 A1* | 10/2014 | Jin | G06F 3/04842 715/790 |
| 2014/0298266 A1* | 10/2014 | Lapp | G06F 3/04886 715/835 |
| 2015/0067596 A1* | 3/2015 | Brown | G06F 3/0416 715/808 |
| 2015/0067608 A1* | 3/2015 | Robert | G06F 3/04817 715/835 |
| 2015/0082163 A1* | 3/2015 | Roth | G06F 3/04883 715/702 |
| 2015/0153929 A1* | 6/2015 | Bernstein | G06F 3/0481 715/781 |

* cited by examiner

METHOD FOR CONTROLLING ELECTRONIC DEVICE WITH TOUCH SCREEN AND ELECTRONIC DEVICE THEREOF

BACKGROUND OF THE INVENTION

1. Field of the Invention

The present invention relates to a method for controlling an electronic device with a touch screen and the electronic device thereof, and more particularly, to a method for controlling an electronic device with a touch screen and the electronic device thereof capable of controlling the electronic device according to a sequence of touch inputs detected on the touch screen.

2. Description of the Prior Art

In recent years, the touch sensing technology develops rapidly. Many consumer electronic devices such as personal digital assistants (PDA), mobile phones, notebooks, tablets possess built-in touch sensing functions. In other words, a display panel originally with only displaying function is replaced by a touch screen, which is capable of performing both display and touch sensing functions. A touch screen can be considered as an interface where both input and output operations can be integrated, which is more powerful than most of traditional user interfaces of the electronic devices.

A touch screen may be equipped with various types of touch input functions, e.g. a user may move a finger on the touch screen to simulate mouse operation, or an on-screen keyboard or handwriting board may be displayed as an input interface. The touch screen should be sensitive to each gesture of touch input in order to perform correct operations, but in some cases, an electronic device not in use should be kept from a mistouch. For example, a mobile device may be put in a pocket and is not in use. In such a condition, screen lock may be applied to avoid a mistouch. In general, the touch input function is locked after a predefined period of time that the touch screen does not receive any touch inputs. When the user wants to unlock this device, the screen may show indication that the user should follow up. This indication may be a password, or a graphic user interface (GUI) specifying a target position and movement on which the touch input should be performed. Sometimes, this indication may not be ergonomic. For example, for a larger mobile device, the user may not easily input the password or perform the required touch input indication if only one hand is available. Besides, in some cases, people may want to unlock the device without looking at it for convenience. Such operation is not feasible when using the conventional unlocking methods.

Thus, there is a need for providing an unlocking method capable of unlocking an electronic device with ergonomics, which allows the user to unlock the electronic device more easily. Moreover, the gestures for screen unlocking should be applied for any other functions of the electronic device as well.

SUMMARY OF THE INVENTION

It is therefore an objective of the present invention to provide a method for controlling an electronic device with a touch screen and the electronic device thereof, which allows the user to control the electronic device by performing touch input ergonomically.

The present invention discloses a method for controlling an electronic device with a touch screen. The method comprises detecting a sequence of touch inputs within a predefined area on the touch screen; determining a sequence of dots and bars according to the sequence of touch inputs; and performing a predefined function on the electronic device when the sequence of dots and bars conforms to a predefined sequence of dots and bars.

The present invention further discloses a non-transitory computer-readable medium embodying a program executable in an electronic device, where the program comprises code for detecting a sequence of touch inputs within a predefined area on the touch screen; code for determining a sequence of dots and bars according to the sequence of touch inputs; and code for performing a predefined function on the electronic device when the sequence of dots and bars conforms to a predefined sequence of dots and bars.

The present invention further discloses a touch-based electronic device comprising a touch screen; a processing means; and a storage unit. The storage unit is utilized for storing a program code to indicate the processing means to perform the following steps: detecting a sequence of touch inputs within a predefined area on the touch screen; determining a sequence of dots and bars according to the sequence of touch inputs; and performing a predefined function on the electronic device when the sequence of dots and bars conforms to a predefined sequence of dots and bars.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
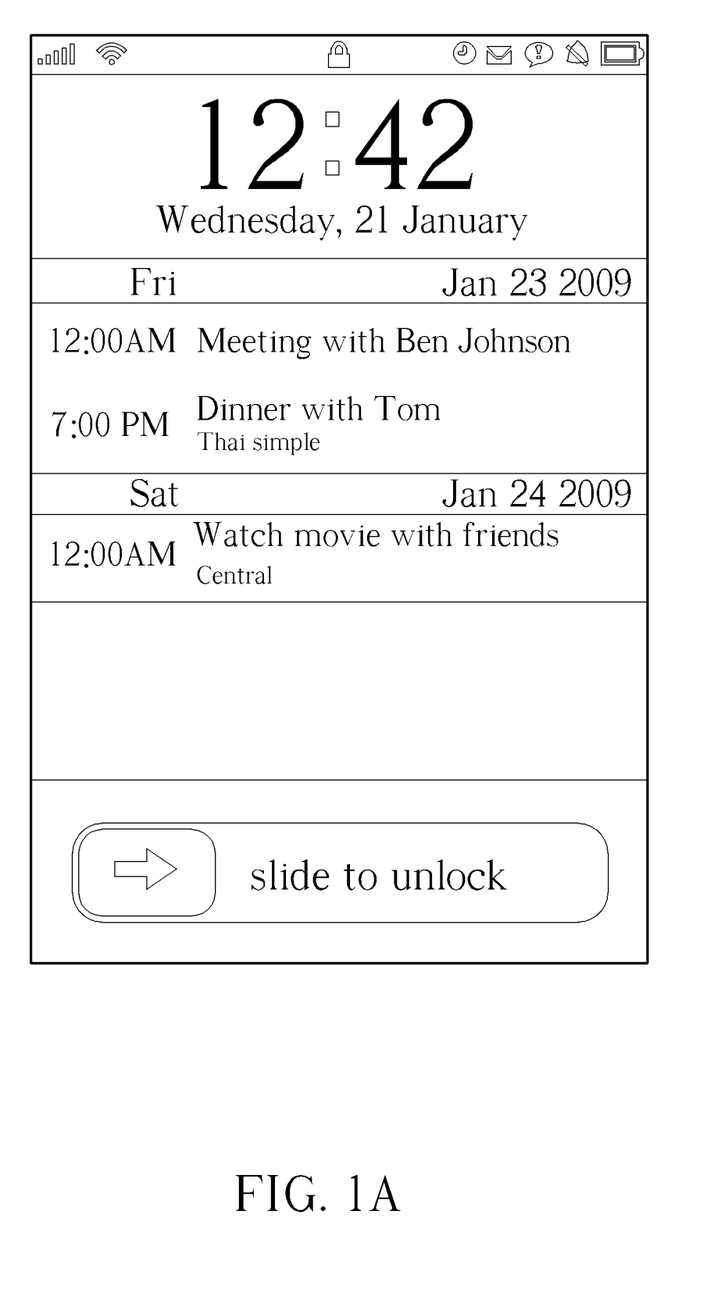
FIG. 1A to FIG. 1C are schematic diagrams of a touch screen with general screen unlocking functions.
Figure 1B:
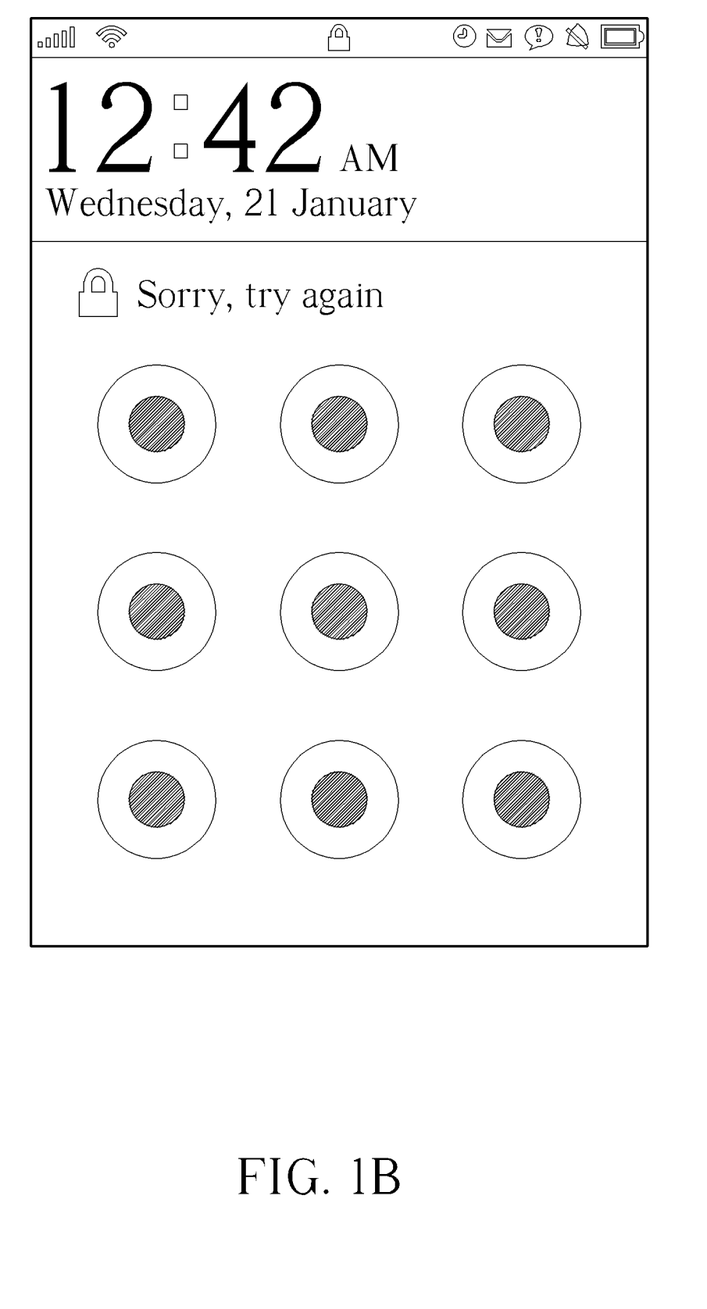
Figure 1C:
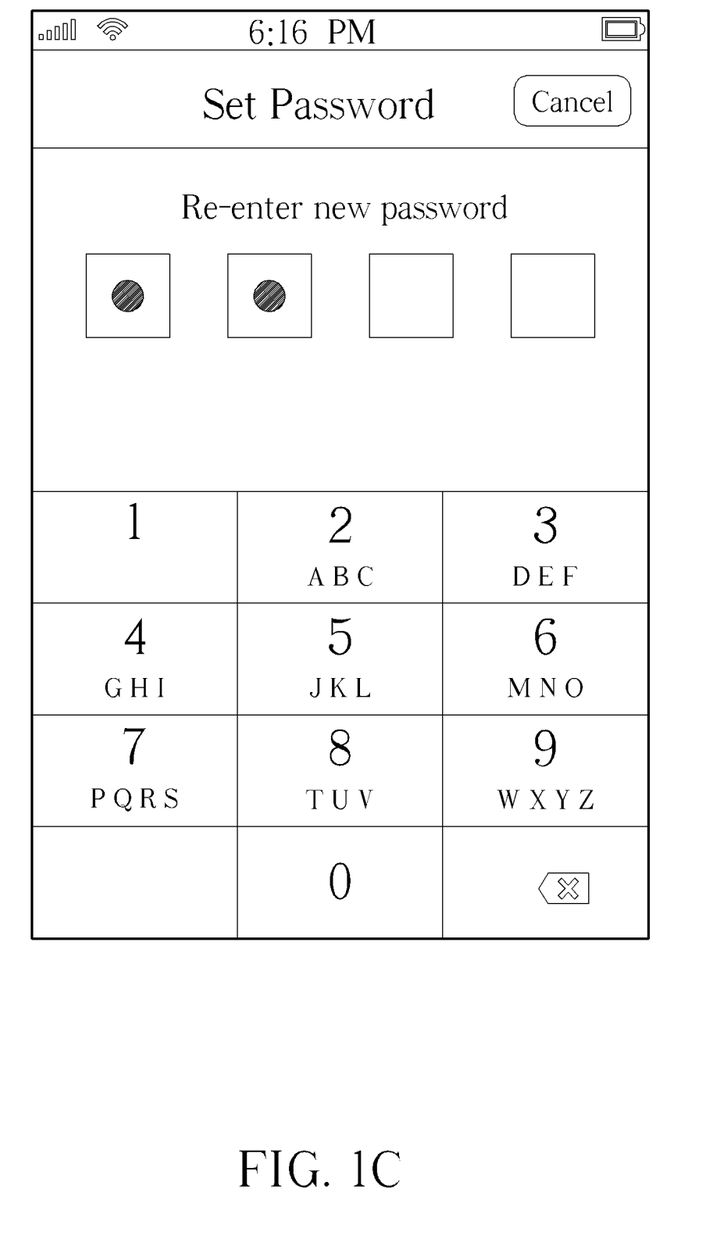

Please refer to FIG. 1A to FIG. 1C, which are schematic diagrams of a touch screen with general screen unlocking functions. The general screen unlocking methods for a mobile device are usually performed based on indication displayed on the screen that the user should follow up. Sometimes the methods may be realized by a horizontal sliding bar shown on the bottom of the screen, as shown in FIG. 1A. When security is taken into account, a more complex pattern may be displayed. As shown in FIG. 1B, there are 9 specific points displayed on the touch screen, and the user should perform a touch input to connect several of those points in a predefined order, in order to unlock the device. When higher security is required, a password may be used as shown in FIG. 1C. The abovementioned unlocking methods all have indication on the touch screen and require the user to look at the screen when unlocking. This is not convenient for the user in some cases. In addition, the size of the mobile device may not fit in with the hand size of each user; hence most of these unlocking methods cannot be performed by single hand ergonomically, especially when a password needs to be keyed in.

Therefore, an ergonomic unlocking method which can be performed by only one hand easily and ergonomically is provided in the present invention. If the user cannot look at the touch screen in some specific cases, this unlocking method can also be applied. When the electronic device receives a touch input on the touch screen, the touch input is divided into a "dot" or a "bar".

Figure 2A:
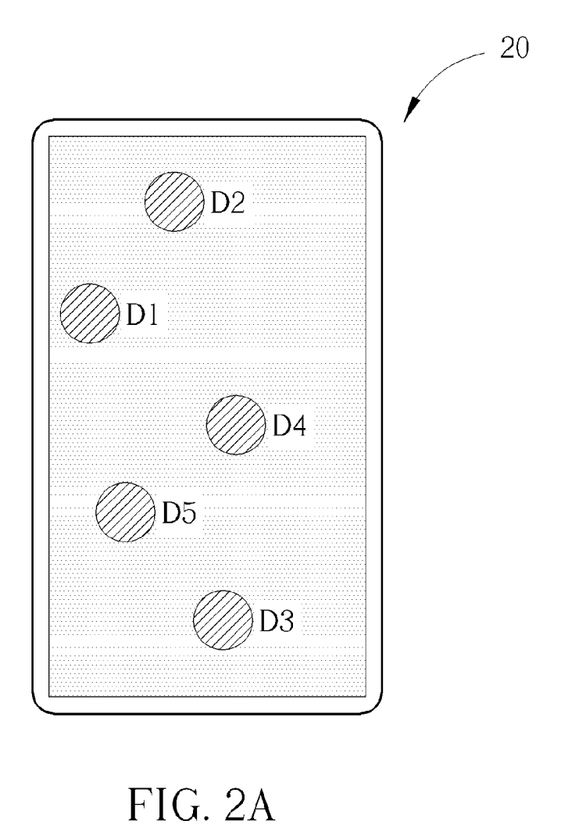
FIG. 2A and FIG. 2B are schematic diagrams of a touch screen according to an embodiment of the present invention.
Figure 2B:
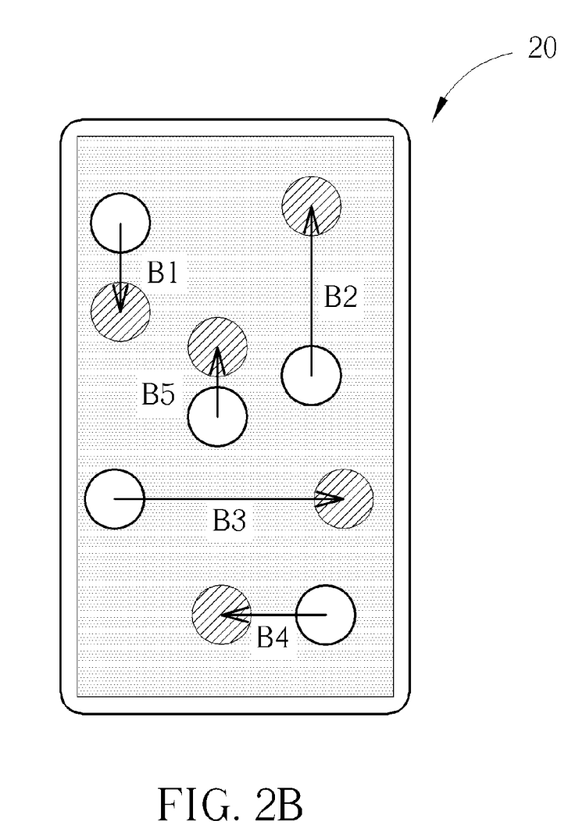

Please refer to FIG. 2A and FIG. 2B, which are schematic diagrams of a touch screen 20 according to an embodiment of the present invention. As shown in FIG. 2A, the touch inputs such as patterns D1-D5 on the touch screen 20 are dots. Please note that, the user may tap a dot on different positions of the touch screen, so that each of the patterns D1-D5 can be considered as a dot gesture. As shown in FIG. 2B, the touch inputs such as patterns B1-B5 on the touch screen 20 are bars. The user may slide a bar from different start points toward different directions on the touch screen, so that each of the patterns B1-B5 can be considered as a bar gesture. In some embodiments, an area on the touch screen is predefined for receiving the touch inputs. In some embodiments, the whole display area of the touch screen is able to receive the touch inputs, which allows the user to arbitrarily perform the dot gesture on a desired position and perform the bar gesture from a desired start point toward a desired direction. In such a condition, no indication of predefined area is required to be displayed on the touch screen, so that the user may perform the touch input on the touch screen without looking at it. In comparison, in the conventional screen unlocking method, a graphic user interface (GUI) should be required for indicating the touch input, as illustrated in FIG. 1A to FIG. 1C.

Figure 3:
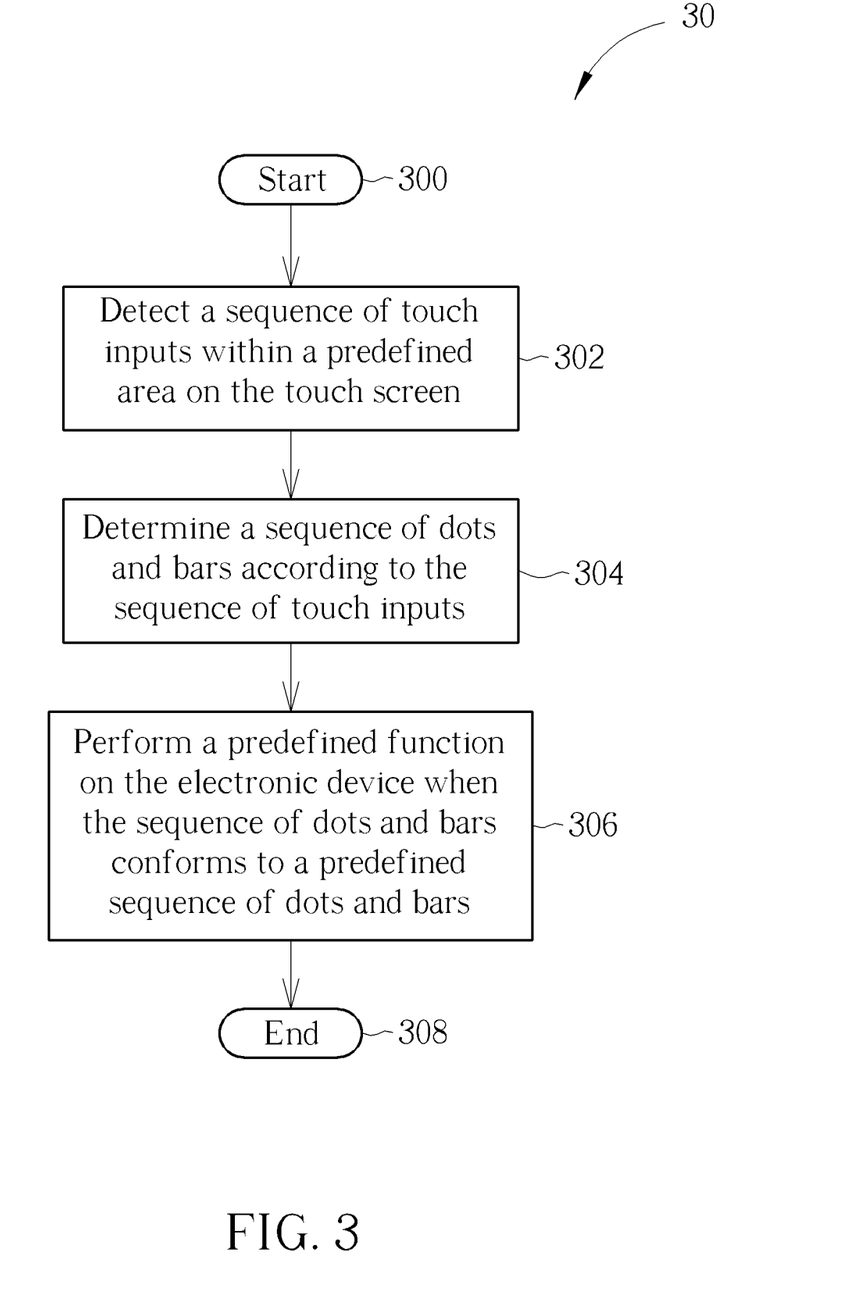
FIG. 3 is a schematic diagram of a process according to an exemplary embodiment of the present invention.

Please refer to FIG. 3, which is a schematic diagram of a process 30 according to an exemplary embodiment of the present invention. The process 30 is utilized for performing a predefined function on an electronic device with a touch screen. The process 30 includes the following steps:

Step 300: Start.

Step 302: Detect a sequence of touch inputs within a predefined area on the touch screen.

Step 304: Determine a sequence of dots and bars according to the sequence of touch inputs.

Step 306: Perform a predefined function on the electronic device when the sequence of dots and bars conforms to a predefined sequence of dots and bars.

Step 308: End.

In Step 302, the electronic device first detects a sequence of touch inputs within a predefined area on the touch screen. As mentioned above, the predefined area where the user can perform touch inputs may be equal to the whole display area of the touch screen, or only a specific part of the display area.

In Step 304, a sequence of dots and bars according to the sequence of touch inputs is determined. For each touch input performed by a finger, the touch sensor may detect the position of a finger contact on the screen, the moving distance and direction of the finger, and the position of the finger removed from the screen. Please note that, in the above information related to the finger, whether a touch input is a dot or bar may only be determined according to the moving distance of the finger, and such determination has nothing to do with the position and the moving direction of the finger. In some embodiments, when the moving distance is smaller than a threshold, the touch input is determined to be a dot; when the moving distance is greater than the threshold, the touch input is determined to be a bar.

Since the moving distance of touch input gesture can easily be sensed by the user via the finger in contrast with the position or direction, the user may use any one finger to perform the touch input without looking at the touch screen. If the mobile device is held in a hand of the user, it is easy to use a thumb to perform the touch input gesture ergonomically, which achieves convenience, especially when only one hand is available.

In Step 306, the electronic device may determine whether the sequence of dots and bars conforms to a predefined sequence of dots and bars. If the input sequence of dots and bars conforms to the predefined sequence of dots and bars, the predefined function should be performed on the electronic device. The predefined function may be any operations of the electronic device. In some embodiments, the predefined function is unlocking of the touch screen or the electronic device. In the following paragraphs, screen unlocking functions are detailed as examples of the present invention.

Figure 4A:
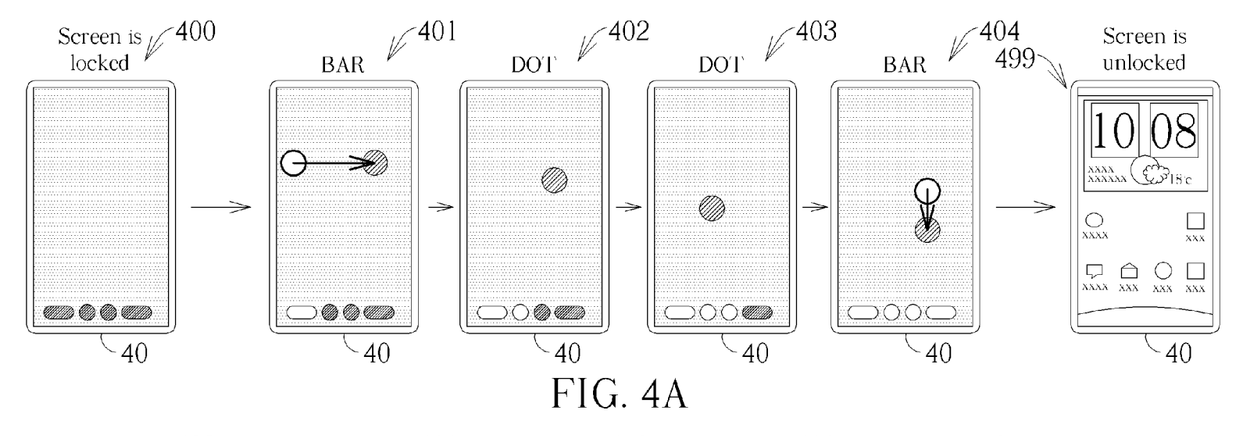
FIG. 4A is a schematic diagram of a touch screen according to an embodiment of the present invention.

Please refer to FIG. 4A, which is a schematic diagram of a touch screen 40 according to an embodiment of the present invention. As shown in FIG. 4A, a sequence of touch inputs is illustrated in screen shots 400-404 and 499 on the touch screen 40. The screen shot 400 displays a locked status, where there is a specific pattern covered on the background of the touch screen 40 to indicate that the screen is locked. A hint composed of the predefined sequence of dots and bars may be displayed on the bottom of the touch screen 40. In FIG. 4A, the hint indicates that the predefined sequence is "bar", "dot", "dot" and "bar". The screen shots 401-404 display a screen unlocking process, where the user performs the touch input conforming to the predefined sequence. The hint in the bottom of the touch screen 40 shows the touch input gestures having been performed (white) and not yet performed (black). In other embodiments, the hint may indicate the predefined sequence or the status of unlocking in other manners, or the hint may also be disposed in other places of the mobile device, which is not limited herein. After the unlocking sequence of touch inputs is performed, the screen will be unlocked as illustrated in the screen shot 499.

Figure 4B:
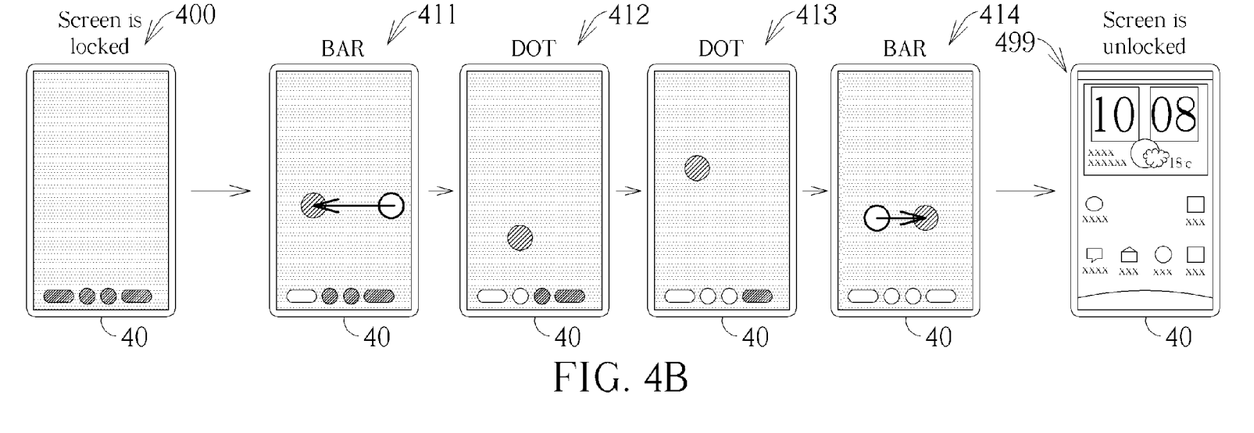
FIG. 4B is a schematic diagram of a touch screen according to another embodiment of the present invention.

Please refer to FIG. 4B, which is a schematic diagram of a touch screen 40 according to another embodiment of the present invention. As shown in FIG. 4B, another sequence of touch inputs is illustrated in screen shots 400, 411-414, and 499 on the touch screen 40. The screen shots 411-414 display another screen unlocking process with the sequence of touch inputs equal to "bar", "dot", "dot" and "bar" as well, but the positions of the dots and the start points and moving directions of the bars are different from those in the screen shots 401-404. The unlocking sequence shown in the screen shots 411-414 may also lead to the unlocked status shown in the screen shot 499. As can be seen, the unlocking sequence shown in the screen shots 411-414 is equivalent to that shown in the screen shots 401-404. In detail, the dot shown in the screen shot 412 is equivalent to that shown in the screen shot 402, which is further equivalent to the dot shown in the screen shot 403 or 413; the bar shown in the screen shot 411 is equivalent to that shown in the screen shot 401, which is further equivalent to the bar shown in the screen shot 404 or 414. If the whole display area of the touch screen 40 is utilized for sensing the touch inputs, all of the dot and bar gestures on the touch screen 40 can be recognized, which allows the user to unlock the electronic device easily by one hand.

Figure 5A:
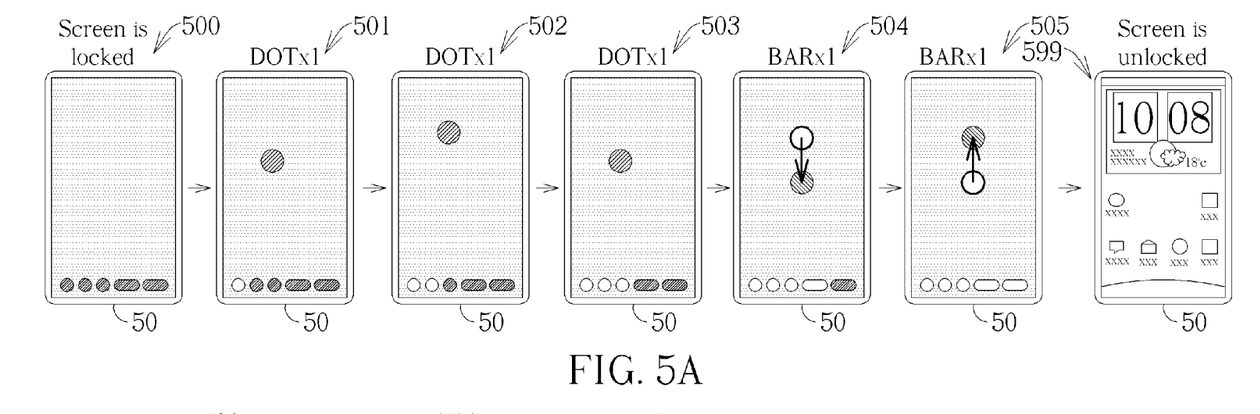
FIG. 5A is a schematic diagram of a touch screen according to an embodiment of the present invention.
Figure 5B:
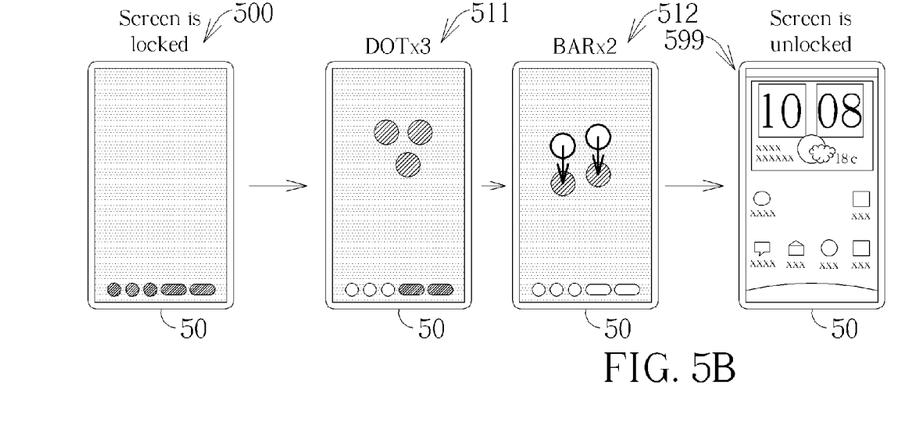
FIG. 5B is a schematic diagram of a touch screen according to another embodiment of the present invention.

Please refer to FIG. 5A, which is a schematic diagram of a touch screen 50 according to an embodiment of the present invention. As shown in FIG. 5A, a sequence of touch inputs is illustrated in screen shots 500-505 and 599 on the touch screen 50. The screen shot 500 displays a locked status, and the appearance thereof is similar to the screen shot 400. A hint indicating a predefined unlocking sequence "dot", "dot", "dot", "bar" and "bar" is displayed on the bottom of the touch screen 50. A corresponding screen unlocking process is displayed in the screen shots 501-505, and this process is easily performed by one hand. However, when there are more touch inputs in the predefined unlocking sequence, the above screen unlocking process that each of the dots and bars is performed respectively will be time consuming. In such a condition, another screen unlocking process illustrated in the screen shots 511 and 512 may also be feasible, as shown in FIG. 5B. In the screen shot 511, 3 dot gestures are performed at the same time, and in the screen shot 512, 2 bar gestures are performed at the same time, which allows the screen unlocking process to be performed more rapidly. More specifically, if both hands are available for performing the touch input, the user may use the left hand to hold the mobile device, and use 3 fingers of the right hand to perform the dot gestures shown in the screen shot 511 and use 2 fingers of the right hand to perform the bar gestures shown in the screen shot 512. The speed of performing the screen unlocking process can therefore be increased.

Figure 6A:
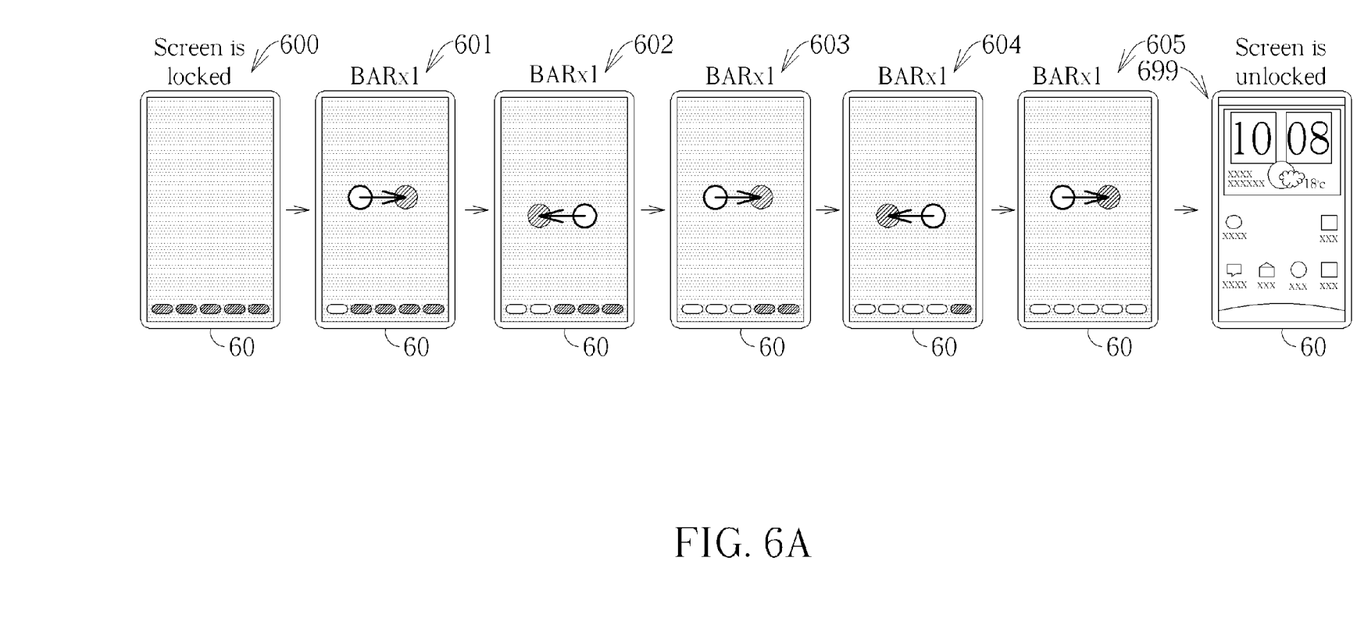
FIG. 6A to FIG. 6C are schematic diagrams of a touch screen according to an embodiment of the present invention.
Figure 6B:
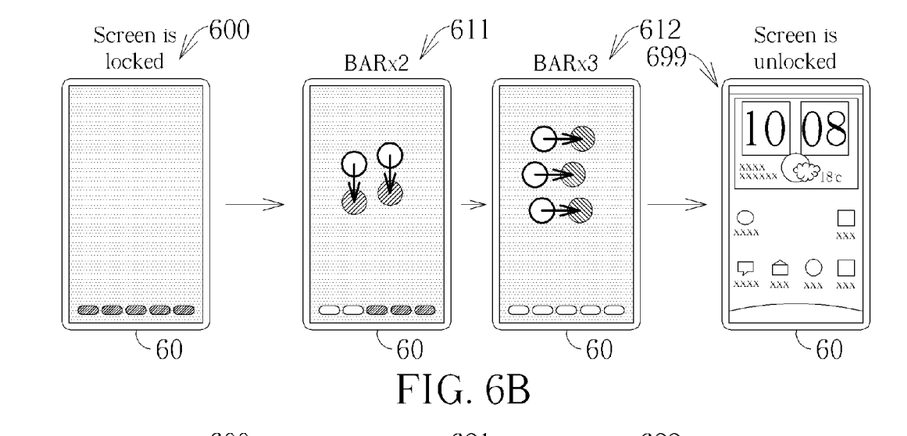
Figure 6C:
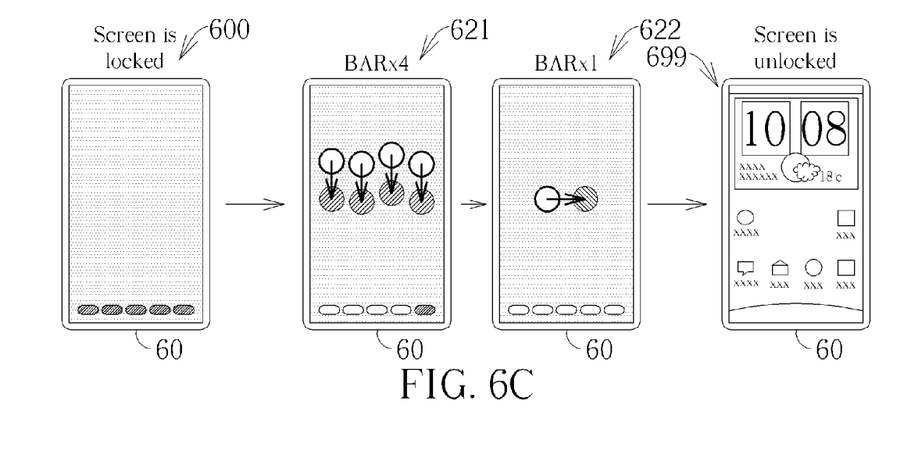

Another embodiment is shown in FIG. 6A to FIG. 6C, which are schematic diagrams of a touch screen 60 according to an embodiment of the present invention. As shown in FIG. 6A, a sequence of touch inputs is illustrated in screen shots 600-605 and 699 on the touch screen 60. The screen shot 600 displays a locked status, and the appearance thereof is similar to the screen shot 400. A hint indicating a predefined unlocking sequence "bar", "bar", "bar", "bar" and "bar" is displayed on the bottom of the touch screen 60. As mentioned above, these 5 bar gestures may be performed separately or together. As shown in FIG. 6B, the screen shots 611 and 612 display 2 simultaneous dot gestures and 3 simultaneous dot gestures, respectively. As shown in FIG. 6C, the screen shots 621 and 622 display 4 simultaneous dot gestures and 1 dot gesture, respectively. Please note that, the touch input gestures shown in the screen shots 601-605, the screen shots 611 and 612, and the screen shots 621 and 622 can all complete the screen unlocking process and lead to the unlocked status shown in the screen shot 699. As a result, any number of same and adjacent touch inputs in the predefined sequence may be performed at the same time, so that the user may choose a screen unlocking process arbitrarily based on the predefined sequence, which enhances flexibility for performing the touch input.

Figure 7:
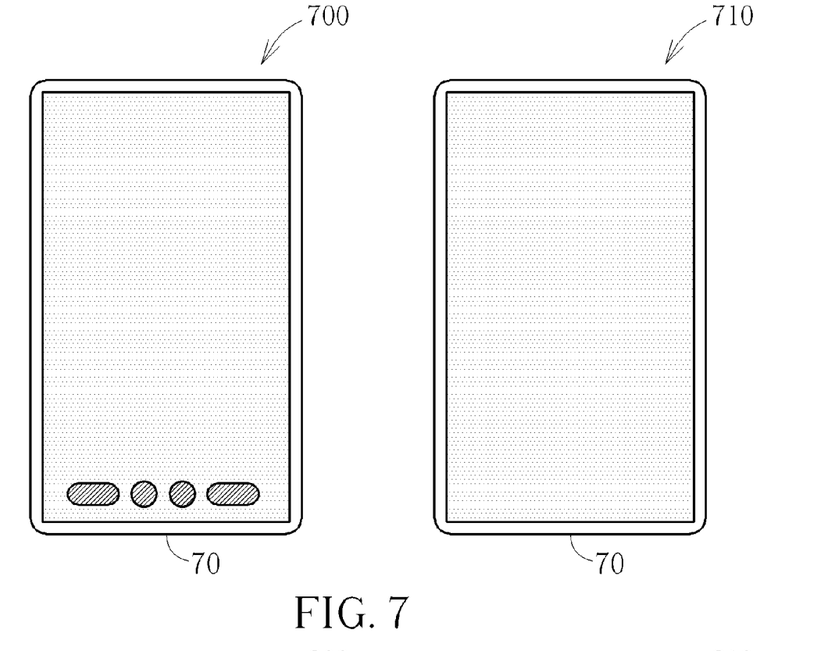
FIG. 7 is a schematic diagram of a touch screen with hint setting for security according to an embodiment of the present invention.

Sometimes higher security is required for screen unlocking in case the mobile device is lost. In such a condition, the hint for unlocking may be hidden. The hint setting for security in a touch screen 70 is shown in FIG. 7, where a screen shot 700 illustrates that the touch screen 70 is in a locked status with a hint for unlocking displayed at the bottom. After performing the hint setting, the hint may be hidden as shown in a screen shot 710, which can achieve the security analogous to that of the general screen unlocking methods illustrated in FIG. 1B and FIG. 1C.

In some cases, the user may make a wrong touch input accidentally. Sometimes this wrong touch input is perceived by the user immediately, but sometimes the user may not be conscious of this mistake and may wonder why the mobile device cannot be unlocked if there is no hint on the touch screen. In such a condition, a restart gesture can be utilized for restarting the screen unlocking process when the user is confused about the unlocking status of the mobile device. When the mobile device detects the restart gesture of touch input on the touch screen, the mobile device will know that the screen unlocking process is restarted and start to detect another sequence of touch inputs on the touch screen. In some embodiments, no matter whether the hint on the bottom of the touch screen is hidden, other indication related to the unlocking status of the mobile device may be shown in the mobile device. This indication may be realized by a light signal or any other types of display signals.

Figure 8:
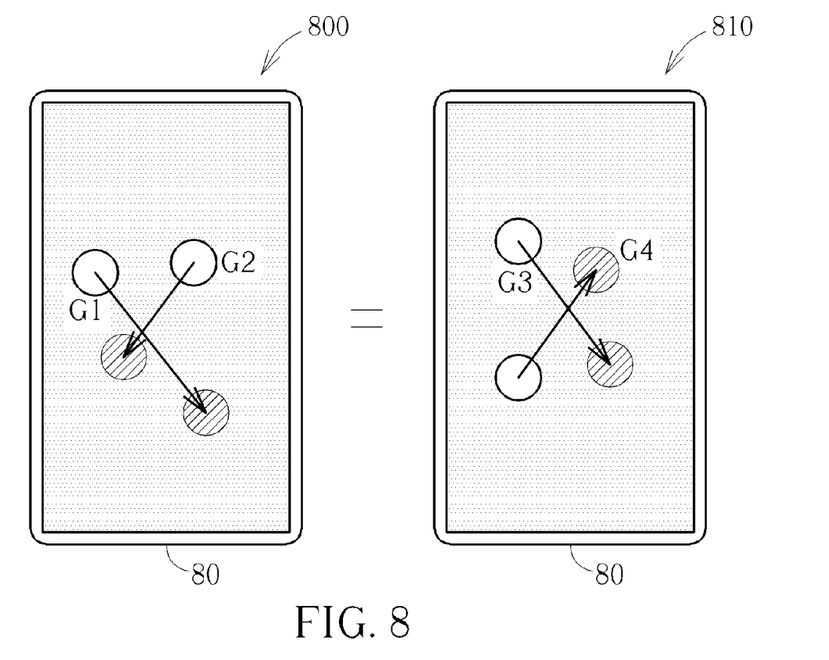
FIG. 8 is a schematic diagram of a touch screen with a restart gesture according to an embodiment of the present invention.

Please refer to FIG. 8, which is a schematic diagram of a touch screen 80 with a restart gesture according to an embodiment of the present invention. As shown in FIG. 8, a crisscross gesture may be considered as the restart gesture, which is illustrated in screen shots 800 and 810. The crisscross gesture can be in any forms or orders. For example, in the screen shot 800, the crisscross gesture is composed of touch inputs G1 and G2, which are equivalent to the combination of touch inputs G3 and G4 shown in the screen shot 810. Both crisscross gestures in the screen shots 800 and 810 lead to restart of the screen unlocking process even if the direction of the touch input G4 is different from that of the touch input G2. In other embodiments, other gestures of touch inputs may also be applied as the restart gesture, which may or may not include the crisscross gesture, and is not limited herein.

Please note that, the electronic device may be unlocked by using an ergonomic method according to the above embodiments of the present invention. Those skilled in the art can make modifications and alternations accordingly. For example, the above screen unlocking methods with a sequence of touch inputs composed of dots and bars may also be applied for performing other functions in the mobile device, such as screen locking, phone call setting, application control, etc. In addition, the predefined sequence of dots and bars can be determined in any other ways, where there may be any number of dots and bars in the predefined sequence and the order of these dots and bars can be determined arbitrarily. In some embodiments, the predefined sequence of dots and bars may be meaningful, which allows the user to remember the predefined sequence even if the predefined sequence is long.

For example, Morse Code may define a sequence of dots and bars. In the above embodiments, the sequence "bar", "dot", "dot" and "bar" illustrated in FIGS. 4A and 4B can be interpreted as the characteristic "X", the sequence "dot", "dot", "dot", "bar" and "bar" illustrated in FIGS. 5A and 5B can be interpreted as the characteristic "7", and the sequence "bar", "bar", "bar", "bar" and "bar" illustrated in FIGS. 6A, 6B and 6C can be interpreted as the characteristic "0" according to the Morse Code. By using the Morse Code, an alphabetic string or a sentence can correspond to a sequence of dots and bars, so that the sequence of touch inputs is meaningful and can be encrypted as a password, which provides higher security and can be recognized and remembered by the user. With such security, the unlocking method may be applicable to other electronic devices with high security purposes or requirements, such as an electronic door lock.

Figure 9:
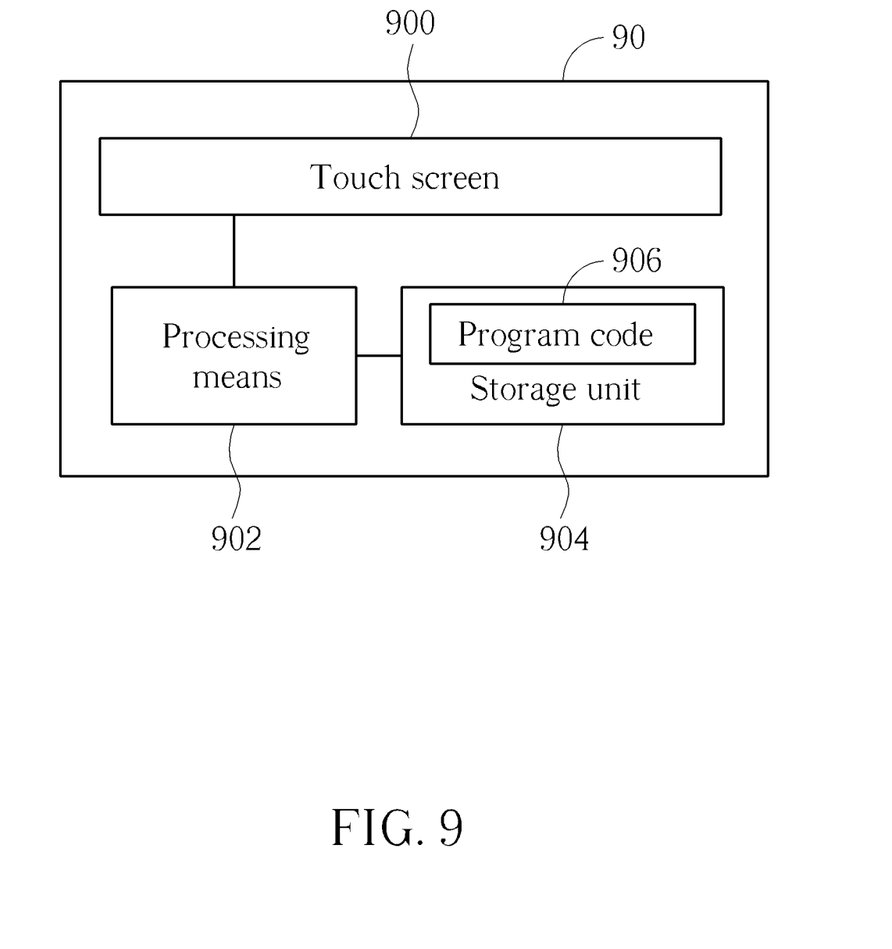
FIG. 9 is a schematic diagram of a mobile device according to an embodiment of the present invention.

Please note that, the abovementioned screen unlocking methods may be compiled into corresponding program code to be implemented in a mobile device. Please refer to FIG. 9, which is a schematic diagram of a mobile device 90 according to an embodiment of the present invention. As shown in FIG. 9, the mobile device 90 includes a touch screen 900, a processing means 902, a storage unit 904 and a program code 906. The program code 906 is stored in the storage unit 904, and can be executed by the processing means 902 to perform operations corresponding to the above screen unlocking methods according to user gestures received by the touch screen 900. Implementing the methods through the program code 906 should be well-known to those skilled in the art, and is not detailed herein. Noticeably, the processing means 902 and the storage unit 904 of the mobile device 90 may be implemented via hardware, software, or firmware, etc., though not limited thereto. The mobile device 90 may be any electronic product such as a mobile phone, a personal digital assistant (PDA), etc.

Please note that in the context of this disclosure, a non-transitory computer-readable medium stores programs for use by or in connection with an instruction execution system, apparatus, or device. In this regard, one example, among others, is a non-transitory computer-readable medium embodying a program executable in a computing device with a touch screen such as the mobile device 90 shown in FIG. 9. In accordance with such examples, the program comprises code for detecting a sequence of touch inputs within a predefined area on the touch screen, code for determining a sequence of dots and bars according to the sequence of touch inputs, and code for performing a predefined function on the electronic device when the sequence of dots and bars conforms to a predefined sequence of dots and bars. Other alternations related to the abovementioned methods may also be compiled to the program executable in the computing device.

The abovementioned computer-readable medium can be any medium that can contain, store, or maintain the program described herein for use by or in connection with the instruction execution system. The computer-readable medium may comprise any one of physical media such as, for example, magnetic, optical, or semiconductor media. More specific examples of a suitable computer-readable medium may include, but not limited to, a magnetic tape, a magnetic floppy diskette, a magnetic hard drive, a memory card, a solid-state drive, a USB flash drive, an optical disc, a random access memory (RAM) including a static random access memory (SRAM), a dynamic random access memory (DRAM) and a magnetic random access memory (MRAM), a read-only memory (ROM) including a programmable read-only memory (PROM), an erasable programmable read-only memory (EPROM), an electrically erasable programmable read-only memory (EEPROM), or other type of memory device.

In the prior art, for a larger mobile device, the user may not easily input a password or perform a required touch input indication if only one hand is available. In some cases, people may want to unlock the device without looking at it for convenience. Such operation is not feasible when using the conventional unlocking methods. In comparison, the present invention provides a method for controlling an electronic device with a touch screen and the electronic device thereof, which determines whether a sequence of touch inputs conforms to a predefined sequence of touch inputs according to whether each of the touch inputs is a dot or bar. The user can therefore control the electronic device by performing touch input ergonomically.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling an electronic device with a touch screen, comprising:
   detecting a sequence of touch inputs within a predefined area on the touch screen;
   determining a sequence of dots and bars forming the sequence of touch inputs according to at least one moving distance of the sequence of touch inputs without determining a position and moving direction of the sequence of touch inputs within the predefined area; and
   performing a predefined function on the electronic device when the sequence of dots and bars conforms to a predefined sequence of dots and bars;
   wherein the step of determining the sequence of dots and bars forming the sequence of touch inputs comprises:
      determining a touch input to be a dot gesture when a moving distance of the touch input is smaller than a threshold, or a bar gesture when the moving distance of the touch input is greater than the threshold.

2. The method of claim 1, wherein the predefined function comprises unlocking the electronic device.

3. The method of claim 1, further comprising:
   displaying a hint composed of the predefined sequence of dots and bars on the touch screen.

4. The method of claim 1, wherein the predefined area comprises all display area of the touch screen.

5. The method of claim 1, further comprising:
   detecting another sequence of touch inputs within the predefined area on the touch screen in response to detecting a restart gesture of a touch input on the touch screen.

6. The method of claim 5, wherein the restart gesture comprises a crisscross gesture.

7. The method of claim 1, wherein the predefined sequence of dots and bars conforms to a Morse code.

8. The method of claim 1, wherein no indication of the predefined area is displayed on the touch screen.

9. A non-transitory computer-readable medium embodying a program executable in an electronic device with a touch screen, the program comprising:
   code for detecting a sequence of touch inputs within a predefined area on the touch screen;
   code for determining a sequence of dots and bars forming the sequence of touch inputs according to at least one moving distance of the sequence of touch inputs without determining a position and moving direction of the sequence of touch inputs within the predefined area; and
   code for performing a predefined function on the electronic device when the sequence of dots and bars conforms to a predefined sequence of dots and bars;
   wherein the code for determining the sequence of dots and bars forming the sequence of touch inputs comprises:
      code for determining a touch input to be a dot gesture when a moving distance of the touch input is smaller than a threshold, or a bar gesture when the moving distance of the touch input is greater than the threshold.

10. The non-transitory computer-readable medium of claim 9, wherein the predefined function comprises unlocking the electronic device.

11. The non-transitory computer-readable medium of claim 9, wherein the program further comprises:
   code for displaying a hint composed of the predefined sequence of dots and bars on the touch screen.

12. The non-transitory computer-readable medium of claim 9, wherein the predefined area comprises all display area of the touch screen.

13. The non-transitory computer-readable medium of claim 9, wherein the program further comprises:

code for detecting another sequence of touch inputs within the predefined area on the touch screen in response to detecting a restart gesture of a touch input on the touch screen.

14. The non-transitory computer-readable medium of claim 13, wherein the restart gesture comprises a crisscross gesture.

15. The non-transitory computer-readable medium of claim 9, wherein the predefined sequence of dots and bars conforms to a Morse code.

16. The non-transitory computer-readable medium of claim 9, wherein no indication of the predefined area is displayed on the touch screen.

17. A touch-based electronic device, comprising:
a touch screen;
a processing means; and
a storage unit, for storing a program code indicating the processing means to perform the following steps:
detecting a sequence of touch inputs within a predefined area on the touch screen;
determining a sequence of dots and bars forming the sequence of touch inputs according to at least one moving distance of the sequence of touch inputs without determining a position and moving direction of the sequence of touch inputs within the predefined area; and
performing a predefined function on the electronic device when the sequence of dots and bars conforms to a predefined sequence of dots and bars;
wherein the step of determining the sequence of dots and bars forming the sequence of touch inputs comprises:
determining a touch input to be a dot gesture when a moving distance of the touch input is smaller than a threshold, or a bar gesture when the moving distance of the touch input is greater than the threshold.

18. The electronic device of claim 17, wherein the predefined function comprises unlocking the electronic device.

19. The electronic device of claim 17, wherein the program code further indicates the processing means to perform the following step:
displaying a hint composed of the predefined sequence of dots and bars on the touch screen.

20. The electronic device of claim 17, wherein the predefined area comprises all display area of the touch screen.

21. The electronic device of claim 17, wherein the program code further indicates the processing means to perform the following step:
detecting another sequence of touch inputs within the predefined area on the touch screen in response to detecting a restart gesture of a touch input on the touch screen.

22. The electronic device of claim 21, wherein the restart gesture comprises a crisscross gesture.

23. The electronic device of claim 17, wherein the predefined sequence of dots and bars conforms to a Morse code.

24. The electronic device of claim 17, wherein no indication of the predefined area is displayed on the touch screen.

* * * * *